(12) United States Patent
Reddy

(10) Patent No.: US 7,918,296 B2
(45) Date of Patent: Apr. 5, 2011

(54) COOLING SYSTEM FOR AN ELECTRIC DRIVE MACHINE AND METHOD

(75) Inventor: Suresh B. Reddy, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 393 days.

(21) Appl. No.: 12/210,874

(22) Filed: Sep. 15, 2008

(65) Prior Publication Data

US 2010/0065355 A1     Mar. 18, 2010

(51) Int. Cl.
B60K 13/02     (2006.01)

(52) U.S. Cl. ........................ 180/68.3; 180/68.2

(58) Field of Classification Search .............. 180/68.1, 180/68.2, 68.3, 68.5, 339; 123/559.1, 564
See application file for complete search history.

(56) References Cited

U.S. PATENT DOCUMENTS

| | | |
|---|---|---|
| 2,279,407 A | 8/1942 | McCune |
| 2,409,099 A | 10/1946 | Bloomfield |
| 2,482,840 A | 9/1949 | Collins et al. |
| 2,520,204 A | 8/1950 | Hancock |
| 3,216,769 A | 11/1965 | Hicks et al. |
| 3,250,973 A | 5/1966 | Dawson |
| 3,259,216 A | 7/1966 | Klaus et al. |
| 3,370,218 A | 2/1968 | Merz |
| 3,410,375 A | 11/1968 | Schmidt |
| 3,495,404 A | 2/1970 | Thompson |
| 3,562,565 A | 2/1971 | Higashino |
| 3,670,854 A | 6/1972 | Maci |
| 3,696,893 A | 10/1972 | Koivunen |
| 3,730,596 A | 5/1973 | Felix et al. |
| 3,774,095 A | 11/1973 | Coccia |
| 3,944,287 A | 3/1976 | Nagase |
| 3,992,062 A | 11/1976 | Jeffrey et al. |
| 4,031,440 A | 6/1977 | Christian et al. |
| 4,054,821 A | 10/1977 | Williamson |
| 4,083,469 A | 4/1978 | Schexnayder |
| 4,143,280 A | 3/1979 | Kuehn, Jr. et al. |
| 4,181,366 A | 1/1980 | Dobner |
| 4,270,806 A | 6/1981 | Venkataperumal et al. |
| 4,280,073 A | 7/1981 | Miller |
| 4,292,531 A | 9/1981 | Williamson |
| 4,313,517 A | 2/1982 | Pivar |
| 4,482,813 A | 11/1984 | Grand-Perret et al. |
| 4,495,449 A | 1/1985 | Black et al. |
| 4,651,071 A | 3/1987 | Imanaka |
| 4,659,149 A | 4/1987 | Rumsey et al. |
| 4,671,577 A | 6/1987 | Woods |
| 4,698,561 A | 10/1987 | Buchanan et al. |
| 4,772,829 A | 9/1988 | Pickering et al. |

(Continued)

*Primary Examiner* — Hau V Phan
(74) *Attorney, Agent, or Firm* — Leydig, Voit & Meyer

(57) ABSTRACT

A cooling system (500) for an electric drive system includes a cooling duct (502) extending between a first component and a second component. A motor (336) driven fan (510) creates an airflow within the duct. A first temperature sensor measures a first temperature of the first component and a second temperature sensor measures a second temperature of the second component. An electronic controller (540) receives the first temperature and calculates a first temperature difference between the first temperature and the first temperature limit (802) to generate a first command (836) for the motor (336). A second temperature difference between the second temperature and the second temperature limit (802) generates a second command (836) for the motor (336). The controller (540) then selects the greater of the first command (836) and the second command (836) to yield the maximum command (836), and controls the motor (336) based on the maximum command (836).

20 Claims, 9 Drawing Sheets

U.S. PATENT DOCUMENTS

| | | | | |
|---|---|---|---|---|
| 4,938,321 | A | 7/1990 | Kelley et al. | |
| 4,962,969 | A | 10/1990 | Davis | |
| 4,965,513 | A | 10/1990 | Haynes et al. | |
| 5,103,923 | A | 4/1992 | Johnston et al. | |
| 5,139,121 | A | 8/1992 | Kumura et al. | |
| 5,222,787 | A | 6/1993 | Eddy et al. | |
| 5,280,223 | A | 1/1994 | Grabowski et al. | |
| 5,293,966 | A | 3/1994 | Chareire | |
| 5,302,008 | A | 4/1994 | Miyake et al. | |
| 5,322,147 | A | 6/1994 | Clemens | |
| 5,323,095 | A | 6/1994 | Kumar | |
| 5,351,775 | A | 10/1994 | Johnston et al. | |
| 5,355,978 | A | 10/1994 | Price et al. | |
| 5,362,135 | A | 11/1994 | Riddiford et al. | |
| 5,378,053 | A | 1/1995 | Patient et al. | |
| 5,432,413 | A | 7/1995 | Duke et al. | |
| 5,450,324 | A | 9/1995 | Cikanek | |
| 5,469,943 | A | 11/1995 | Hill et al. | |
| 5,472,264 | A | 12/1995 | Klein et al. | |
| 5,476,310 | A | 12/1995 | Ohtsu et al. | |
| 5,490,572 | A * | 2/1996 | Tajiri et al. | 180/68.2 |
| 5,492,192 | A | 2/1996 | Brooks et al. | |
| 5,511,859 | A | 4/1996 | Kade et al. | |
| 5,523,701 | A | 6/1996 | Smith et al. | |
| 5,539,641 | A | 7/1996 | Littlejohn | |
| 5,551,764 | A | 9/1996 | Kircher et al. | |
| 5,573,312 | A | 11/1996 | Müller et al. | |
| 5,615,933 | A | 4/1997 | Kidston et al. | |
| 5,632,534 | A | 5/1997 | Knechtges | |
| 5,707,115 | A | 1/1998 | Bodie et al. | |
| 5,754,450 | A | 5/1998 | Solomon et al. | |
| 5,755,302 | A | 5/1998 | Lutz et al. | |
| 5,769,509 | A | 6/1998 | Feigel et al. | |
| 5,775,784 | A | 7/1998 | Koga et al. | |
| 5,832,395 | A | 11/1998 | Takeda et al. | |
| 5,839,800 | A | 11/1998 | Koga et al. | |
| 5,853,229 | A | 12/1998 | Willmann et al. | |
| 5,937,664 | A * | 8/1999 | Matsuno et al. | 62/259.2 |
| 5,951,115 | A | 9/1999 | Sakai et al. | |
| 5,961,190 | A | 10/1999 | Brandmeier et al. | |
| 5,962,997 | A | 10/1999 | Maisch | |
| 5,983,149 | A | 11/1999 | Tate et al. | |
| 6,076,899 | A | 6/2000 | Isella | |
| 6,078,173 | A | 6/2000 | Kumar et al. | |
| 6,087,791 | A | 7/2000 | Maruyama | |
| 6,120,115 | A | 9/2000 | Manabe | |
| 6,158,822 | A | 12/2000 | Shirai et al. | |
| 6,186,254 | B1 * | 2/2001 | Mufford et al. | 429/442 |
| 6,213,567 | B1 | 4/2001 | Zittlau et al. | |
| 6,226,586 | B1 | 5/2001 | Luckevich et al. | |
| 6,231,134 | B1 | 5/2001 | Fukasawa et al. | |
| 6,242,873 | B1 | 6/2001 | Drozdz et al. | |
| 6,318,487 | B2 | 11/2001 | Yanase et al. | |
| 6,325,470 | B1 | 12/2001 | Schneider | |
| 6,392,418 | B1 | 5/2002 | Mir et al. | |
| 6,394,210 | B2 * | 5/2002 | Matsuda et al. | 180/68.1 |
| 6,425,643 | B2 | 7/2002 | Shirai et al. | |
| 6,441,573 | B1 | 8/2002 | Zuber et al. | |
| 6,456,909 | B1 | 9/2002 | Shimada et al. | |
| 6,457,784 | B1 | 10/2002 | Böhm et al. | |
| 6,488,344 | B2 | 12/2002 | Huls et al. | |
| 6,547,343 | B1 | 4/2003 | Hac | |
| 6,560,515 | B2 | 5/2003 | Inoue | |
| 6,651,761 | B1 * | 11/2003 | Hrovat et al. | 429/442 |
| 6,662,891 | B2 * | 12/2003 | Misu et al. | 180/68.1 |
| 6,663,197 | B2 | 12/2003 | Joyce | |
| 6,664,653 | B1 | 12/2003 | Edelman | |
| 6,687,593 | B1 | 2/2004 | Crombez et al. | |
| 6,709,075 | B1 | 3/2004 | Crombez et al. | |
| 6,724,165 | B2 | 4/2004 | Hughes | |
| 6,750,630 | B2 * | 6/2004 | Inoue et al. | 320/104 |
| 6,771,040 | B2 | 8/2004 | Kusumoto | |
| 6,815,933 | B2 | 11/2004 | Taniguchi et al. | |
| 6,885,920 | B2 | 4/2005 | Yakes et al. | |
| 6,889,672 | B2 * | 5/2005 | Criddle et al. | 123/559.1 |
| 6,892,713 | B2 * | 5/2005 | Criddle et al. | 123/559.1 |
| 6,910,747 | B2 | 6/2005 | Tsunehara | |
| 6,933,692 | B2 | 8/2005 | Gabriel et al. | |
| 6,959,971 | B2 | 11/2005 | Tsunehara | |
| 6,986,727 | B2 | 1/2006 | Kuras et al. | |
| 7,025,159 | B2 * | 4/2006 | Smith et al. | 180/68.1 |
| 7,029,077 | B2 | 4/2006 | Anwar et al. | |
| 7,059,691 | B2 | 6/2006 | Tsunehara et al. | |
| 7,079,379 | B2 * | 7/2006 | Yamaguchi et al. | 180/68.5 |
| 7,104,617 | B2 | 9/2006 | Brown | |
| 7,136,737 | B2 | 11/2006 | Ashizawa et al. | |
| 7,152,417 | B2 * | 12/2006 | Morishita et al. | 62/186 |
| 7,240,752 | B2 * | 7/2007 | Takahashi et al. | 180/68.1 |
| 7,290,840 | B2 | 11/2007 | Tsunehara et al. | |
| 7,308,352 | B2 | 12/2007 | Wang et al. | |
| 7,311,163 | B2 | 12/2007 | Oliver | |
| 7,330,012 | B2 | 2/2008 | Ahmad et al. | |
| 7,378,808 | B2 | 5/2008 | Kuras et al. | |
| 7,385,372 | B2 | 6/2008 | Ahmad et al. | |
| 7,607,501 | B2 * | 10/2009 | Smith et al. | 180/68.1 |
| 7,733,065 | B2 * | 6/2010 | Yoon et al. | 320/150 |
| 2001/0024062 | A1 | 9/2001 | Yoshino | |
| 2002/0043962 | A1 | 4/2002 | Taniguchi et al. | |
| 2002/0050739 | A1 | 5/2002 | Koepff et al. | |
| 2002/0117984 | A1 | 8/2002 | Zuber et al. | |
| 2003/0132039 | A1 | 7/2003 | Gaffney et al. | |
| 2003/0149521 | A1 | 8/2003 | Minowa et al. | |
| 2003/0151387 | A1 | 8/2003 | Kumar | |
| 2003/0169002 | A1 | 9/2003 | Hughes | |
| 2004/0090116 | A1 | 5/2004 | Tsunehara | |
| 2004/0108789 | A1 | 6/2004 | Marshall | |
| 2004/0239180 | A1 | 12/2004 | Foust | |
| 2004/0251095 | A1 | 12/2004 | Simard et al. | |
| 2005/0099146 | A1 | 5/2005 | Nishikawa et al. | |
| 2006/0047400 | A1 | 3/2006 | Prakash et al. | |
| 2006/0055240 | A1 | 3/2006 | Toyota et al. | |
| 2006/0086547 | A1 | 4/2006 | Shimada et al. | |
| 2006/0089777 | A1 | 4/2006 | Riddiford et al. | |
| 2006/0102394 | A1 | 5/2006 | Oliver | |
| 2007/0016340 | A1 | 1/2007 | Soudier et al. | |
| 2007/0145918 | A1 | 6/2007 | Kumar et al. | |
| 2007/0182359 | A1 | 8/2007 | Wahler | |
| 2008/0084229 | A1 | 4/2008 | Frommer et al. | |
| 2010/0041327 | A1 * | 2/2010 | Desler | 454/184 |
| 2010/0205989 | A1 * | 8/2010 | Creed et al. | 62/228.5 |

* cited by examiner

COOLING SYSTEM FOR AN ELECTRIC DRIVE MACHINE AND METHOD

TECHNICAL FIELD

This patent disclosure relates generally to systems and methods for electric drives and, more particularly, to cooling systems and methods for cooling electric drive components of a machine.

BACKGROUND

Cooling systems typically use circulating fluid or coolant to absorb heat from various components of the machine. The circulating fluid absorbs heat from various components thus removing it therefrom as it flows through the cooling system. The heat or thermal energy collected is removed from the fluid, typically in a radiator or another similar device.

Known cooling systems are effective in cooling various components of a vehicle but have limitations as to their operating temperatures and system requirements. For example, the heat absorption capacity of a liquid-coolant system depends on the flow rate of the coolant as well as on the total volume of coolant in the system. One disadvantage of liquid-coolant systems is their implementation in applications having weight restrictions because of the weight of the fluid and related cooling system components that are carried onboard the vehicle. In applications having both weight restrictions in addition to requiring the removal of large amount of heat, adequate cooling using a liquid-based cooling system may not be practical and may also add weight and complexity to the vehicle.

Another disadvantage of liquid-coolant systems is the electrical conductivity of the cooling medium. Because water is typically a main component of a liquid-coolant mixture, the electrical conductivity that is inherent to such mixtures makes their use unsuitable for cooling electrical components internally, such as generators and motors. Electric drive vehicles must rely on use of other mediums, such as air, for cooling. As is known, the heat capacity of air is lower than that of water or a liquid-based coolant, which means that a large volume of air must be used to match the cooling capacity of a liquid-based coolant. The energy expended to move large volumes of air around and through various components of the vehicle reduces the fuel or energy efficiency of the vehicle. Moreover, cooling systems using air, especially when used to cool more than one areas or components of the vehicle, require ducts that extend to the various components of the vehicle. Such ducts are usually large to accommodate the high volumes of air flowing to cool each components, which makes the routing of the ducts and the positioning of components in the design of the vehicle more complex and costly.

SUMMARY

The disclosure describes, in one aspect, a cooling system for cooling components of an electric drive system. The cooling system includes a cooling duct extending between a first component and a second component. A motor driven fan creates an airflow within the duct. A first temperature sensor measures a first temperature of the first component and a second temperature sensor measures a second temperature of the second component. An electronic controller receives the first temperature and calculates a first temperature difference between the first temperature and the first temperature limit to generate a first command for the motor. The electronic controller receives the second temperature and calculates a second temperature difference between the second temperature and the second temperature limit to generate a second command for the motor. The controller then selects the greater of the first command and the second command to yield the maximum command, and controls the motor based on the maximum command.

In another aspect, the disclosure describes a machine having an electric drive system. The electric drive system includes an engine connected to a generator. The generator has an electrical output connected to a rectifier. The rectifier is connected to an inverter, which is connected to an electric drive motor. The machine further includes a cooling duct in fluid communication with a first component and a second component. A fan motor operates a blower disposed within the cooling duct. A first temperature sensor measures a first component temperature and provides a first component temperature sensing signal. A second temperature sensor measures a second component temperature and provides a second component temperature sensing signal. An electronic controller receives the first component temperature sensing signal and the second component temperature sensing signal, calculates a first difference between the first component temperature and a first component temperature limit to generate a first airflow command based on the first difference, calculates a second difference between the second component temperature and a second component temperature limit to generate a second airflow command based on the second difference, compares the first airflow command with the second airflow command to yield a maximum desired airflow, and commands the fan motor to operate such that the maximum desired airflow is generated within the cooling duct.

In yet another aspect, the disclosure describes a method of operating a blower disposed in a convective cooling system associated with a first component and a second component of a machine. The cooling system includes a cooling duct that directs a cooling flow of air toward the first component and the second component, and a blower operating under the control of a controller to direct a cooling flow of air through the cooling duct. The method includes sensing a first temperature of the first component and providing a first temperature signal indicative of the first temperature, and sensing a second temperature of the second component and providing a second temperature signal indicative of the second temperature. The first temperature signal is compared with a first temperature limit to yield a first temperature difference, and a first desired airflow is calculated based on the first temperature difference. The second temperature signal is compared to a second temperature limit to yield a second temperature difference, and a second desired airflow based on the second temperature difference. The greater of the first desired airflow and the second desired airflow is selected to yield a maximum desired airflow, and the blower is operated to generate a flow of air in the cooling duct that is at least equal to the maximum desired airflow.

DETAILED DESCRIPTION

This disclosure relates to systems and methods for cooling drive components of an electric drive machine or vehicle. The disclosure that follows uses an example of a direct series electric drive vehicle having an engine connected to a generator for producing electrical power that drives the vehicle. In the exemplary embodiments presented, heat produced by friction or electrical energy passing through electric drive components when the machine is operating is removed and expelled to the environment. The systems and methods disclosed herein have applicability to other electric drive vehicles. Additional examples for an air cooling system for an electric drive machine can be seen in U.S. patent application Ser. No. 12/150,222, which was filed on Apr. 25, 2008, and titled "Air Cooling System for Electric Drive Machine," and which is incorporated herein in its entirety by reference. In general, a machine or vehicle may include an electric drive with power stored in one or more batteries or other storage devices, instead of being generated by an engine driven generator. This embodiment may store excess power produced during retarding in the batteries or other mechanical energy storage devices and arrangements rather than dissipating it in the form of heat.

Figure 1A:
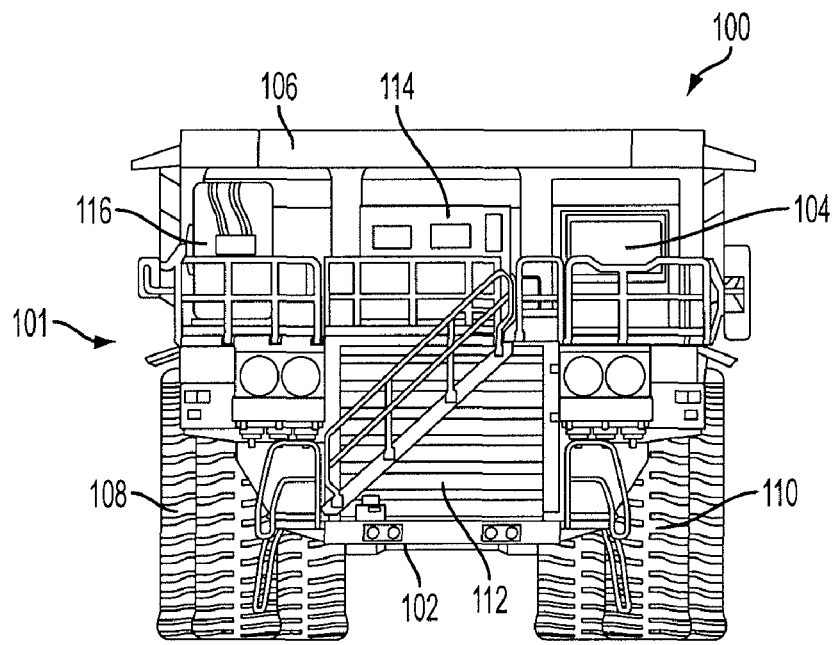
FIGS. 1A and 1B are, respectively, a front view and a side view of a machine in accordance with the disclosure.
Figure 1B:
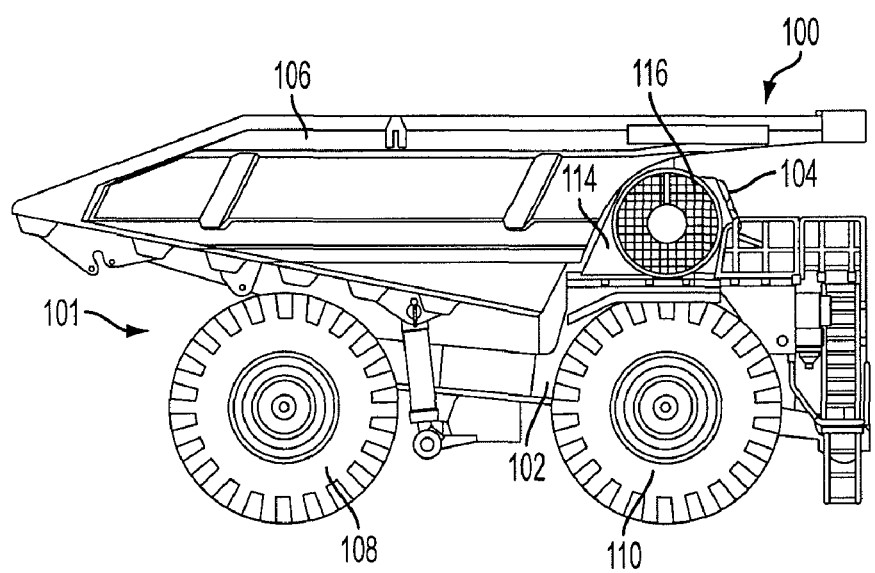

FIG. 1A and FIG. 1B illustrate, respectively, a front and a side view of a machine 100. The machine 100 is a direct series electric drive machine. One example of the machine 100 is an off-highway truck 101 such as those used for construction, mining, or quarrying. In the description that follows, this example illustrates the various arrangements that can be used on machines having direct series electric drive systems. As can be appreciated, any other vehicle having a direct series electric drive or electric-only arrangement can benefit from the advantages described herein. The term "machine," therefore, is used to generically describe any machine having at least one drive wheel that is driven by a motor connected to the wheel. Electrical power may be generated onboard by a generator, alternator, or another power-generation device, which may be driven by an engine or other prime mover. Alternatively, electrical power may be stored but not generated onboard.

A front view of the off-highway truck 101 is shown in FIG. 1A, and a side view is shown in FIG. 1B. The off-highway truck 101 includes a chassis 102 that supports an operator cab 104 and a bucket 106. The bucket 106 is pivotally connected to the chassis 102 and is arranged to carry a payload when the off-highway truck 101 is in service. An operator occupying the operator cab 104 can control the motion and the various functions of the off-highway truck 101. The chassis 102 supports various drive system components. These drive system components are capable of driving a set of drive wheels 108 to propel the off-highway truck 101. A set of idle wheels 110 can steer such that the off-highway truck 101 can move in any direction. Even though the off-highway truck 101 includes a rigid chassis with powered wheels for motion and steerable wheels for steering, one can appreciate that other machine configurations can be used. For example, such configurations may include articulated chassis with one or more driven wheels.

Figure 2:
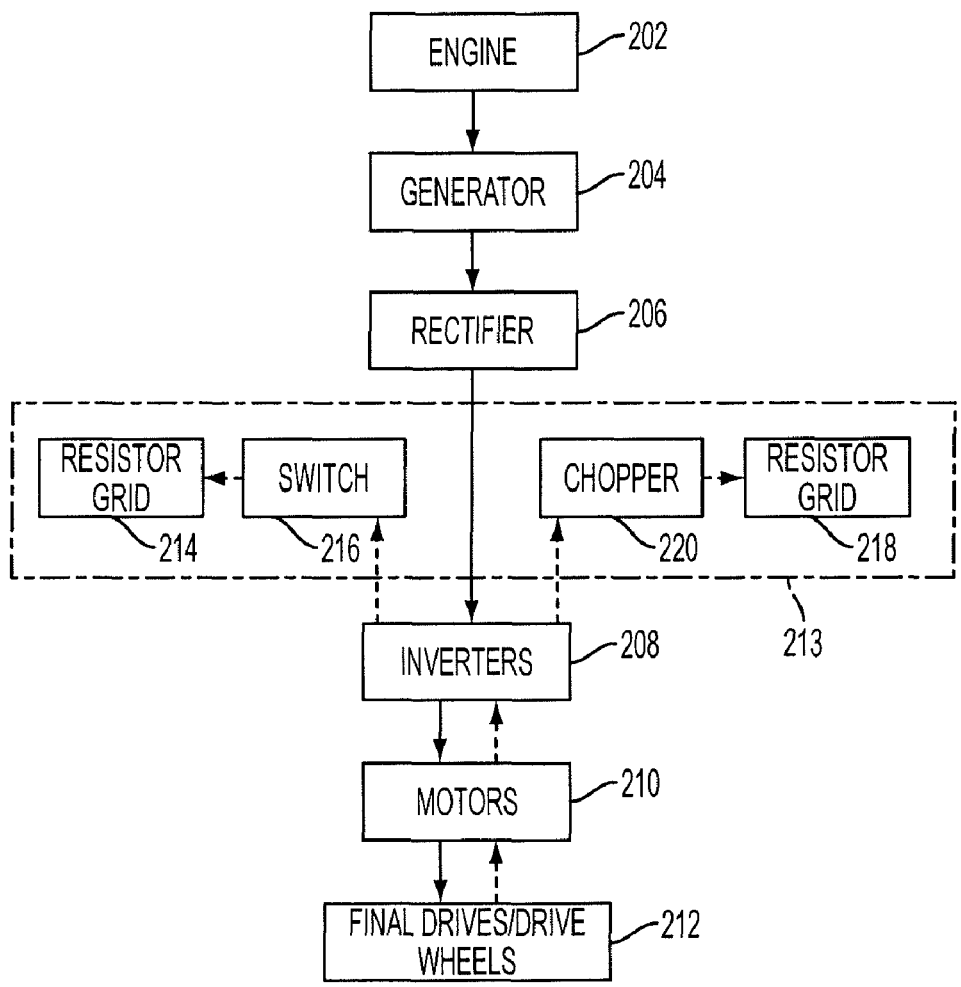
FIG. 2 is a block diagram of a hybrid drive system for a machine in accordance with the disclosure.

The off-highway truck 101 is a direct series electric drive machine, which in this instance refers to the use of more than one source or form of power to drive the drive wheels 108. A block diagram for the direct series electric drive system of the machine 100, for example, the off-highway truck 101, is shown in FIG. 2. In the block diagram, the flow direction of power in the system when the machine is propelled is denoted by solid-lined arrows. Conversely, the flow of power during a retarding mode is shown in dash-lined arrows. The direct series electric drive system includes an engine 202, for example, an internal combustion engine such as a diesel engine, which produces an output torque at an output shaft (not shown). The output shaft of the engine 202 is connected to a generator 204. In operation, the output shaft of the engine 202 rotates a rotor of the generator 204 to produce electrical power, for example, in the form of alternating current (AC) power. This electrical power is supplied to a rectifier 206 and converted to direct current (DC) power. The rectified DC power may be converted again to AC power by an inverter circuit 208. The inverter circuit 208 may be capable of selectively adjusting the frequency and/or pulse-width of its output, such that motors 210 that are connected to an output of the inverter circuit 208 may be operated at variable speeds. The motors 210 may be connected via final assemblies (not shown) or directly to drive wheels 212 of the machine 100.

When the off-highway truck 101 is propelled, the engine 202 generates mechanical power that is transformed into electrical power, which is conditioned by various electrical components. In an illustrated embodiment, such components are housed within a cabinet 114 (FIG. 1A). The cabinet 114 is disposed on a platform that is adjacent to the operator cab 104 and may include the rectifier 206 (FIG. 2), inverter circuit 208 (FIG. 2), and/or other components. When the off-highway truck 101 is to be decelerated or its motion is otherwise to be retarded, for example, to prevent acceleration of the machine when travelling down an incline, its kinetic energy is converted to electrical energy. Effective disposition of this generated electrical power enables effective retarding of the off-highway truck 101.

Specifically, when the machine 100 is retarding, the kinetic energy of the machine 100 is transferred into rotational power of the drive wheels that rotates the motors 210, which act as electrical generators. The electrical power generated by the motors 210 has an AC waveform. Because the inverter circuit 208 is a bridge inverter, power supplied by the motors 210 is rectified by the inverter circuit 208 into DC power. Dissipation of the DC power generated by the motors 210 produces a counter-rotational torque at the drive wheels 108 to decelerate the machine. Dissipation of this DC power may be accomplished by passing the generated current rectified by the inverter circuit 208 through a resistance. To accomplish this, a retarder arrangement 213 may include a first resistor grid 214, described in greater detail below, that is arranged to receive current from the inverter circuit 208 via a switch 216. When the switch 216 is closed, the electrical power corresponding to the current generated by the motors 210 may pass through the first resistor grid 214 and be dissipated as heat. Additionally, excess electrical power is also dissipated as heat as it passes through a second resistor grid 218, which is arranged to receive electrical power via a chopper circuit 220. The chopper circuit 220 operates to selectively route a portion of the developed electrical power through the second resistor grid 218. One embodiment for the drive and retarding system is described in more detail below.

Figure 3:
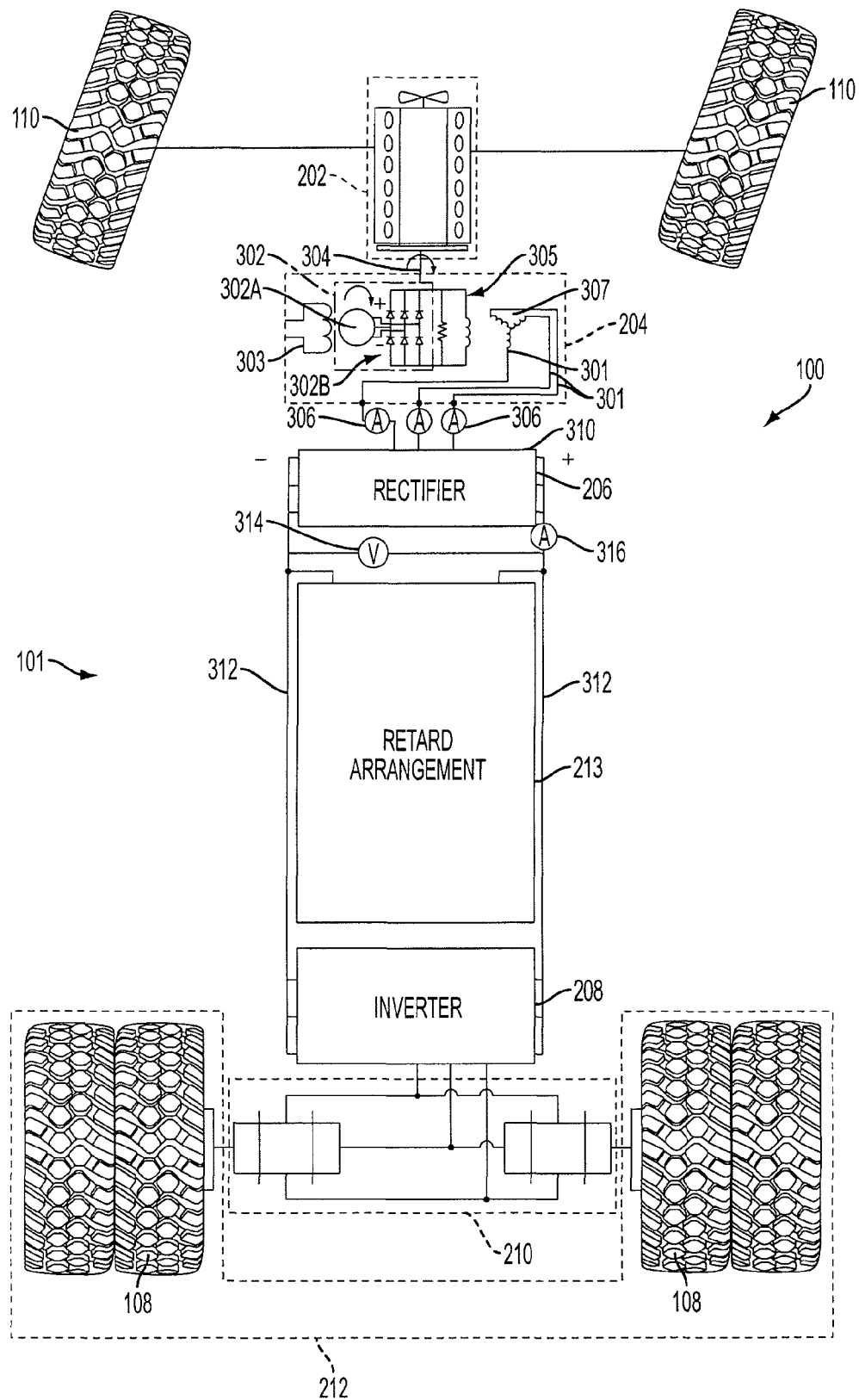
FIG. 3 is a block diagram for a drive and retarding system in accordance with the disclosure.
Figure 4:
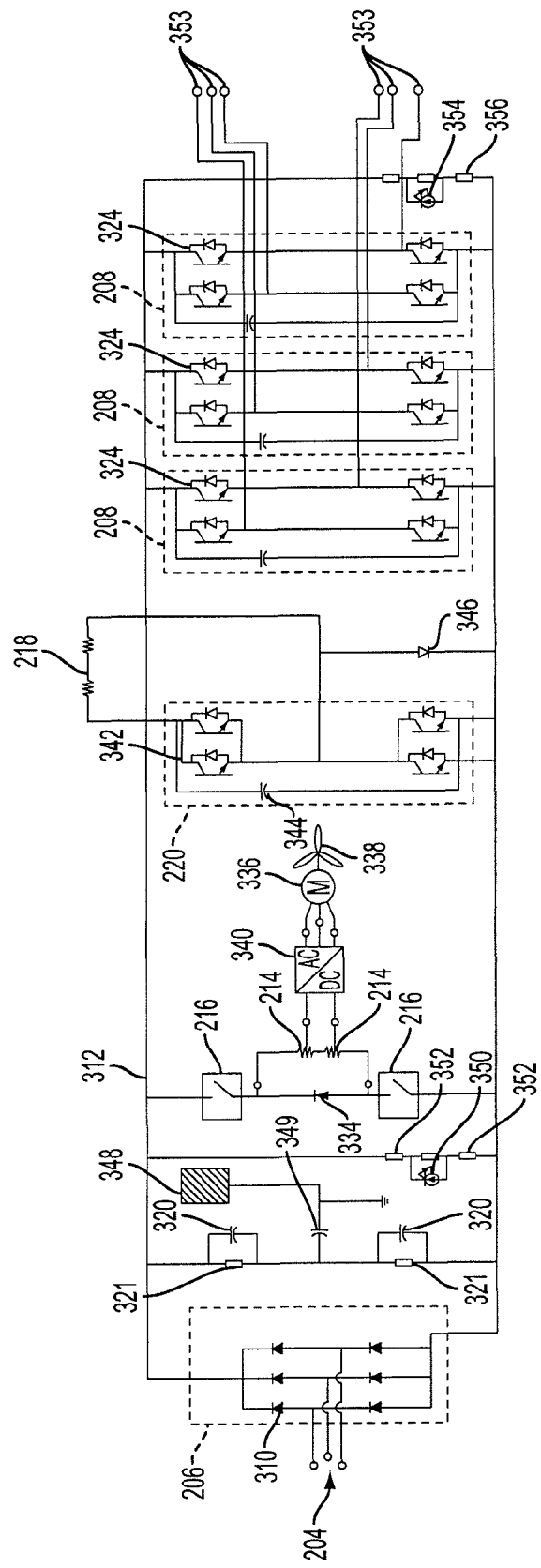
FIG. 4 is a simplified block diagram for the drive and retarding system shown in FIG. 3.

A block diagram of the direct series electric drive system of the off-highway truck 101, as one example for the machine 100, is shown in FIG. 3 and FIG. 4. In these views, elements that were previously described are denoted by the same reference numerals for the sake of simplicity. Further, the block diagram of FIG. 4 includes a particular embodiment with component examples that can be included in the functional blocks shown in FIG. 3. Hence, the block diagrams shown in FIG. 3 and FIG. 4 should be referred to together when considering the description that follows. As shown, the engine 202 is connected to the generator 204 (shown in FIG. 3) via an output drive shaft 304. Even though a direct connection to the output drive shaft 304 is shown, other drive components, such as a transmission or other gear arrangements, may be utilized to couple the output of the engine 202 to the generator 204. The generator 204 may be any appropriate type of generator or alternator known in the power generation art.

In one embodiment, the generator 204 is a three-phase alternating current (AC) synchronous generator having a brushless, wound rotor. The generator 204 has an output 301 for each of three phases of alternating current being generated, with each output having a respective current transducer 306 connected thereto. The rotor of the generator 204 (shown in FIG. 3) includes a rotating rectifier 302 that is connected to a rotating exciter armature 302A. The rotating exciter armature 302A is energized by an excitation field produced by an excitation winding 303. Thus, the application of an excitation signal at the input to the winding 303 creates an excitation field to activate the generator field 305. The generator field 305, in turn, produces the output available at three leads of the armature 307 of the generator 204.

In the illustrated embodiment, the rotating rectifier 302 includes a rotating exciter armature 302A that is connected to a series of rotating diodes 302B. The three current outputs of the generator 204, which are collectively considered the output of the generator 204, are connected to a rectifier 206. Other generator arrangements may alternatively be used.

The rectifier 206 converts the AC power supplied by the generator 204 into DC power. Any type of rectifier 206 may be used. In the example shown, the rectifier 206 includes six power diodes 310 (best shown in FIG. 4) that are arranged in diode pairs around each phase of the output of the generator 204. Each diode pair includes two power diodes 310 that are connected in series to each other, with a connection to each phased output of the generator 204 between each pair. The three pairs of power diodes 310 are connected in parallel to each other and operate to develop a voltage across a DC linkage or DC link 312. This DC link voltage is available at a first rail and a second rail of the DC link 312. The first rail is typically at a first voltage and the second rail is typically at a second voltage during operation. Either of the first and second voltages may be zero.

During operation, a voltage is supplied across the first and second rails of the DC link 312 by the rectifier 206 and/or an inverter circuit 208. One or more capacitors 320 may be connected in parallel with one or more resistors 321 across the DC link 312 to smooth the voltage V across the first and second rails of the DC link 312. The DC link 312 exhibits a DC link voltage, V, which can be measured by a voltage transducer 314, and a current, A, which can be measured by a current transducer 316, as shown in FIG. 3.

The inverter circuit 208 is connected in parallel with the rectifier 206 and operates to transform the DC voltage V into variable frequency sinusoidal or non-sinusoidal AC power that powers, in this example, two drive motors 210 (FIG. 3). Any known inverter may be used for the arrangement of the inverter circuit 208. In the example shown in FIG. 4, the inverter circuit 208 includes three phase arrays of insulated-gate bipolar transistors (IGBT) 324 that are arranged in transistor pairs and that are configured to supply a 3-phase AC output to each drive motor 210.

The inverter circuit 208 can control the speed of the motors 210 by controlling the frequency and/or the pulse-width of the AC output. The drive motors 210 may be directly connected to the drive wheels 108 or, as in the example shown in FIG. 3, may power the final drives that power the drive wheels 212. Final drives, as is known, operate to reduce the rate of rotation and increase the torque between each drive motor 210 and each set of drive wheels 212.

In alternative embodiments, the engine 202 and generator 204 are not required to supply the power necessary to drive the drive motors 210. Instead, such alternative embodiments use another source of power, such as a battery or contact with an electrified rail or cable. In some embodiments, one drive motor 210 may be used to power all drive wheels of the machine, while in other embodiments, any number of drive motors may be used to power any number of drive wheels, including all wheels connected to the machine.

Returning now to the block diagrams of FIG. 3 and FIG. 4, when the machine 100 operates in an electric braking mode, which is also known as electric retarding, less power is supplied from the generator 204 to the DC link 312. Because the machine is travelling at some non-zero speed, rotation of the drive wheels 108 due to the kinetic energy of the machine 100 will power the drive motors 210. The drive motors 210, in this mode, act as generators by producing AC electrical power. Consumption or disposition of this electrical power will consume work and act to apply a counter-rotational torque on the drive wheels 108, causing them to reduce their rotational speed, thus retarding the machine.

The generated AC electrical power can be converted into DC electrical power through the inverter circuit 208 for eventual consumption or disposition, for example, in the form of heat. In an illustrated embodiment, a retarder arrangement 213 consumes such electrical power generated during retarding. The retarder arrangement 213 can include any suitable arrangement that will operate to dissipate electrical power during retarding of the machine. In the exemplary embodiments shown in FIG. 4, the retarder arrangement 213 includes a first resistor grid 214 that is arranged to dissipate electrical energy at a fixed rate. The retarder arrangement 213 also includes a second resistor grid 218, to which DC current is supplied at a selectively variable rate by use of a pulse width modulator (PWM) or chopper circuit 220. In this way, the second resistor grid 218 dissipates electrical energy at a variable rate.

When the machine 100 is to operate in a retarding mode, the first resistor grid 214 is connected between the first and second rails of the DC link 312 so that current may be passed therethrough. When the machine 100 is being propelled, however, the first resistor grid 214 is electrically isolated from the DC link 312 by two contactors or bipolar automatic switches (BAS) 216. Each BAS 216 may include a pair of electrical contacts that are closed by an actuating mechanism, for example, a solenoid (not shown) or a coil creating a magnetic force that attracts the electric contacts to a closed position. The BAS 216 may include appropriate electrical shielding and anti-spark features that can allow these items to operate repeatedly in a high voltage environment.

When the machine 100 initiates retarding, it is desirable to close both BAS 216 within a relatively short time period such that the first resistor grid 214 is placed in circuit between the first and second DC rails to begin energy dissipation rapidly. Simultaneous actuation or actuation at about the same time, such as, within a few milliseconds, of the pair of BAS 216 may also advantageously avoid charging the first resistor grid 214 and other circuit elements to the voltage present at the rails of the DC link 312. The pair of BAS 216 also prevents exposure of each of the BAS 216 or other components in the system to a large voltage difference (the voltage difference across the DC link 312) for a prolonged period. A diode 334 may be disposed in parallel to the first resistor grid 214 to reduce arcing across the BAS 216, which also electrically isolates the first resistor grid 214 from the DC link 312 during a propel mode of operation.

When the machine 100 is retarding, a large amount of heat can be produced by the first resistor grid 214. Such energy, when converted to heat, must be removed from the first resistor grid 214 to avoid an overheating condition. For this reason, a blower 338, driven by a motor 336, operates to convectively cool the first resistor grid 214. There are a number of different alternatives available for generating the power to drive the motor 336. In this embodiment, a DC/AC inverter 340 is arranged to draw power from voltage-regulated locations across a portion of the first resistor grid 214. The DC/AC inverter 340 may advantageously convert DC power from the DC link 312 to 3-phase AC power that drives the motor 336 when voltage is applied to the first resistor grid 214 during retarding.

In the illustrated embodiment, the BAS 216 are not arranged to modulate the amount of energy that is dissipated through the first resistor grid 214. During retarding, however, the machine 100 may have different energy dissipation requirements. This is because, among other things, the voltage V in the DC link 312 should be controlled to be within a predetermined range. To meet such dissipation requirements, the second resistor grid 218 can be exposed to a controlled current during retarding through action of the chopper circuit 220. The chopper circuit 220 may have any appropriate configuration that will allow modulation of the current supplied to the second resistor grid 218. In this embodiment, the chopper circuit 220 includes an arrangement of transistors 342 that can, when actuated according to a desired frequency and/or duration, modulate the current passed to the second resistor grid 218. This controls the amount of energy dissipated by the second resistor grid 218 during retarding. The chopper circuit 220 may additionally include a capacitor 344 that is disposed between the first and second rails of the DC link 312 and that regulates the voltage input to the chopper circuit 220. A switched diode 346 may be connected between the second resistor grid 218 and the DC link 312 to protect against short circuit conditions in the DC link 312.

The passage of current through the second resistor grid 218 will also generate heat, necessitating cooling of the second resistor grid 218. In this embodiment, the first and second resistor grids 214 and 218 may both be located within the blower housing 116 (also shown in FIG. 1A and FIG. 2) for convective cooling when the motor 336 and blower 338 are active.

The embodiment for a drive system shown in FIG. 4 includes other components that are discussed for the sake of completeness. Such components are optional but are shown herein because they promote smooth and efficient operation of the drive system. In this exemplary embodiment, a leakage detector 348 is connected between the two resistors 321, in parallel with a capacitor 349, to the first and second rails of the DC link 312. The leakage detector 348 detects any current leakage to ground from either of the first and second rails of the DC link 312. Further, in one embodiment, a first voltage indicator 350 may be connected between resistors 352 across the first and second rails of the DC link 312. The first voltage indicator 350 may be disposed between the rectifier 206 and the retarder arrangement 213 such that a high voltage condition may be detected. In a similar fashion, a second voltage indicator 354 may be connected between resistors 356 across the first and second rails of the DC link 312. The second voltage indicator 354 may be disposed between connection nodes 353 that connect to the drive motors 210 and the inverter circuit 208 to detect a voltage condition occurring during, for example, a bus bar fracture where the DC link 312 is not continuous, to diagnose whether the inverter is operating.

Figure 5:
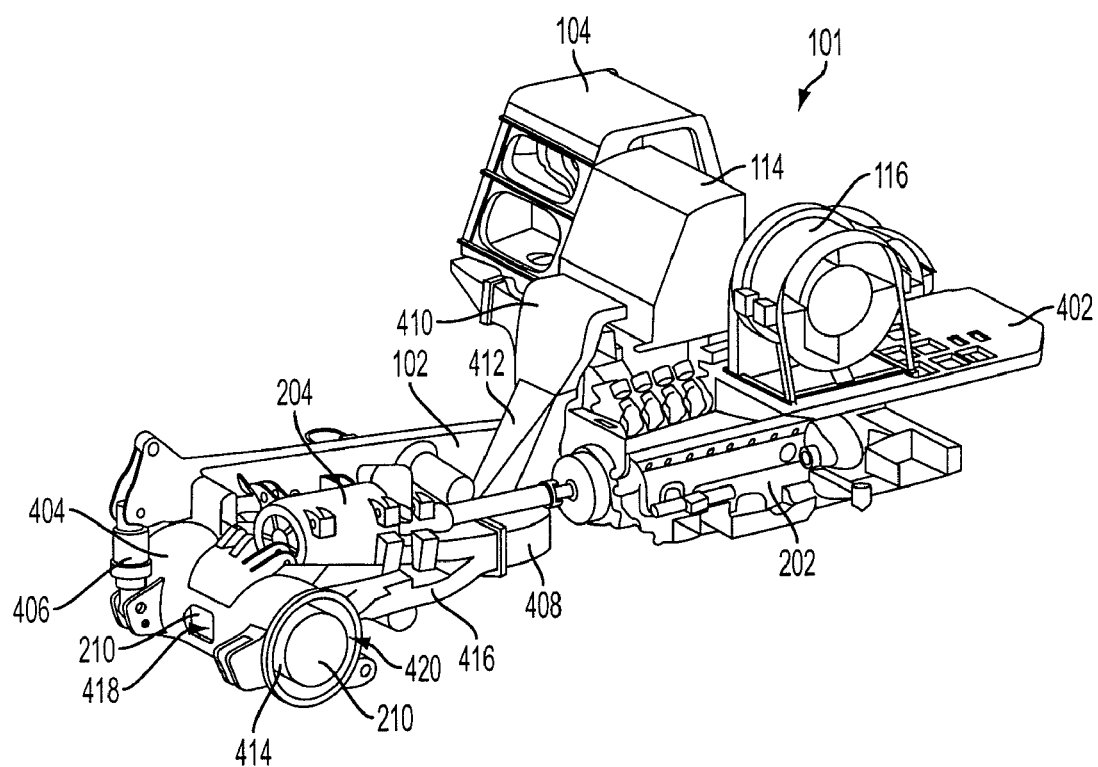
FIG. 5 is a partial cutaway of the machine shown in FIGS. 1A and 1B.

FIG. 5 is a partial cut-away of the off-highway truck 101 of FIGS. 1A and 1B. In this cutaway view, portions of the off-highway truck 101 have been removed or cut-away to reveal components belonging to a drive system. Components that have been previously described are denoted by the same reference numerals as previously used for the sake of simplicity. The operator cab 104 is subtended by the chassis 102, which also supports other drive system components either directly or indirectly. For example, a platform 402 that is connected to the chassis 102 may support the blower housing 116 and the cabinet 114 (also shown in FIGS. 1A and 1B). Appropriate structures may further connect the engine 202 and the generator 204 to the chassis 102. In this exemplary embodiment, two drive motors 210 are enclosed within a hollow axle assembly 404, which is connected to the chassis 102 via a plurality of structures (not shown) and shock absorbers 406 (only one shown).

Various electrical components of the drive system may, or contain within them other components that, generate heat during operation. For example, the cabinet 114 may house the rectifier circuit 206 (FIG. 2), the chopper circuit 220 (FIG. 2), and/or the inverter circuits 208 (FIG. 2), each of which may generate heat during operation. Similarly, the generator 204 and motors 210 may include bearings or wiring, such as wiring comprising their windings. These components generate heat, either by friction in the case of the bearings, or due to the resistance of the wiring when current flows therethrough. It may be desirable to avoid such heating of components to ensure proper operation over a prolonged service life. For this reason, a cooling duct assembly 408 that is capable of directing a cooling flow of air passing therethrough by action of a fan (not shown) can be arranged to direct the cooling air flow toward one or more components of the machine 100.

In the embodiment shown in FIG. 5, the cooling duct assembly 408 includes an inlet or head portion 410 that is connected to the cabinet 114. In the disclosed embodiment, the head portion 410 has a flat rectangular cross section that transitions to a square cross section, and is arranged to pull air from within the cabinet 114 into the cooling duct assembly 408 such that components operating within the cabinet 114 can be convectively cooled. The head portion 410 is appropriately shaped to smoothly route an airflow from the cabinet 114 into a main portion 412 of the cooling duct assembly 408. The main portion 412 includes a generally upright section that is in fluid communication with the head portion 410, and a generally longitudinal section that is in fluid communication with the upright section. The main portion 412 may house the fan (not shown) at a section thereof such that operation of the fan acts to pull air into the cooling duct assembly 408, and push a flow of air through the various portions of the cooling duct assembly 408.

One component arranged to receive air from the cooling duct assembly is the generator 204. Air travelling through the main portion 412 may be partially or entirely routed toward the generator 204. The generator 204 may have appropriate internal passages that permit airflow therethrough for cooling. The generator 204 may alternatively have external features, such as fins, which may promote the flow of air over surfaces of the generator 204 to promote convective cooling.

The main portion 412 of the cooling duct assembly 408 may further be fluidly connected to an internal cavity 414 that is defined within the hollow axle assembly 404. In one embodiment, the internal cavity 414 at least partially encloses or contains the motors 210. Air travelling through the main portion 412 may be routed to the internal cavity 414, either directly from the main portion 412, or alternatively via one or more runners 416, which are optional. Such air flow convectively cools the motors 210. The airflow within the internal cavity 414, and the heat it has absorbed along its path through the cooling duct assembly 408, may be expelled into the environment via an opening 418 formed in the hollow axle assembly 404. Alternatively, heat may be expelled via other openings, for example, a pair of openings 420 formed close to each end of the hollow axle assembly 404.

Figure 6:
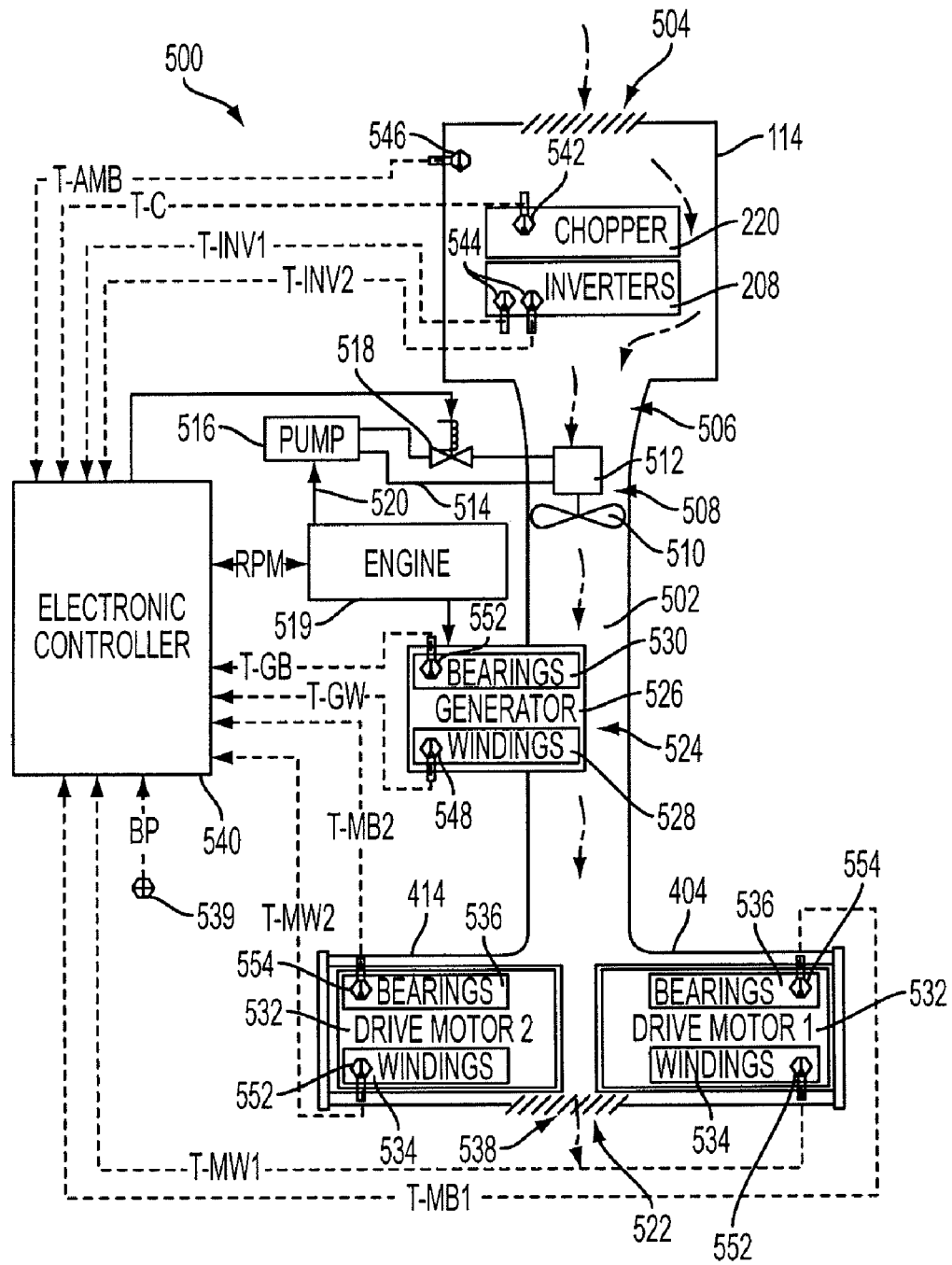
FIG. 6 is a block diagram of a cooling system in accordance with the disclosure.

A block diagram showing the various components and systems that are associated with a cooling duct arrangement in accordance with the disclosure is shown in FIG. 6. As shown therein, a cooling system 500 for use with an electric drive machine 100 (FIG. 1A) includes a cooling duct 502 that substantially surrounds or at least fluidly interacts with various components. The cooling duct 502 has an inlet opening 504 that may be integrated with a component of the machine, for example, the cabinet 114 (FIG. 5). The inlet opening 504 may lead to an inlet portion 506 of the cooling duct 502, which in turn may lead to a fan portion 508. The fan portion 508 may house a fan 510 that is operated by a fan motor 512. The fan motor 512 may be of any appropriate type of device that is driven by any known motive energy type, for example, electrical, hydraulic, pneumatic, mechanical, and so forth.

In the disclosed embodiment, the fan motor 512 is a hydrostatic motor that is disposed within the fan portion 508 and operates by a flow of hydraulic fluid passing through conduits 514. The circulating flow may be impelled by a pump 516. The speed of the fan motor 512 may be controlled by a solenoid valve 518 and may be measured by a sensor (not shown). The control arrangement for controlling the speed of the fan motor 512 may be any number of arrangements. For example, the solenoid valve 518 may shunt or otherwise restrict a portion of the flow of fluid impelled by the pump 516 from reaching the fan motor 512. Similarly, the pump 516 may be driven by the engine 519 of the machine via an input shaft 520 or by any other appropriate method.

During operation, the fan 510 creates air flow through the cooling duct 502. Such airflow through the cooling duct 502 is denoted by dot-dash-dot lined and open headed arrows. This flow of air may enter through the inlet opening 504 and travel the entire length of the cooling duct 502 before exiting via one or more outlet opening(s) 522 defined in the cooling duct 502. Along its path, the airflow may pass over and/or through various components that require convective cooling.

The cooling duct 502 may form a generator portion 524 that at least partially envelopes a portion or passes through a portion of a generator 526 of the machine. The generator 526 may be the generator 204 shown in FIG. 2, and airflow within the cooling duct 502 may convectively cool the generator 526 during operation. The generator 526 has various components, some of which are more sensitive to high temperature than others. Components of the generator that are expected to generate heat during operation include the windings 528 and the rotor bearings 530 of the generator 204. Thus, airflow from the cooling duct 502 may be arranged to pass over or through at least portions of the generator windings 528 and the rotor bearings 530 to cool the same.

The cooling duct 502 may further be fluidly connected to the internal cavity 414 defined within the hollow axle assembly 404 (FIG. 5). In this embodiment, the cooling duct 502 encloses two motors 532. Each of the motors 532 may include a respective motor winding 534 and respective motor bearings 536. As can be appreciated, the airflow within the cooling duct 502 may be arranged to pass over or through portions of these components such that they are cooled during operation.

The airflow within the cooling duct 502, having passed over the various components of the drive system described above, may be expelled into the environment through the one or more outlet opening(s) 522. The exiting airflow carries with it the thermal energy that was removed when the various components that communicate with the cooling duct 502 were convectively cooled. In the embodiment shown in FIG. 6, the one or more outlet opening(s) 522 are shown as a single opening 538 that may be covered by louvers. However, the position of the louvers and the number of openings may be altered, and other configurations may be used.

The cooling system thus far has been described relative to its structure. Activation of the fan 510 when it is determined that various components require cooling is also described herein. It can be appreciated that continuous operation of the fan 510 would likely reduce the fuel efficiency of the machine 100. Hence, the fan 510 should operate in a mode that is both fuel efficient and which provides adequate cooling to the various components of the machine. This can be accomplished via an electronic controller 540, which is disposed to receive temperature information from the various components that are associated with the cooling duct 502. The controller 540 operates in a logical fashion in response to these data to control the operation of the fan 510.

The electronic controller 540 is connected to various temperature sensors or transducers throughout the system. Examples of such sensors and their placement, which are meant as illustrative and non-limiting examples, include a chopper circuit temperature sensor 542 disposed proximate to the chopper circuit 220. The inverter circuits 208 may include one or more inverter temperature sensor(s) 544 (two shown) that are appropriately positioned in areas thereof that are sensitive to high temperatures. Such locations may be adjacent to electronic components that include integrated control circuits, transistors, and so forth. An ambient temperature sensor 546 may be optionally installed within the cabinet 114 to measure the temperature of air (T-AMB) that circulates within the cabinet 114. Air circulating within the cabinet 114, in one embodiment, is air that eventually forms the airflow passing through the cooling duct 502.

Other components of the drive system may also include temperature sensors to measure the temperature of various internal components thereof. For example, the generator 526 may include a generator winding temperature sensor 548 that is disposed to measure the temperature of the windings 528 (T-GW) of the generator 526. A rotor bearing temperature sensor 550 is disposed to measure the temperature of the rotor bearings 530 (T-GB). Similarly, each drive motor 532 may include a respective motor winding temperature sensor 552, disposed to measure the temperature of the windings 534 (T-MW1 and T-MW2) of each motor 532. A respective motor bearing temperature sensor 554 is disposed to measure the temperature of the bearings 536 (T-MB1 and T-MB2) in each motor 532.

These various temperature sensors may be operatively connected to the electronic controller 540 and disposed to communicate information indicative of the various temperatures being measured. The interconnections between the electronic controller 540 and various sensors in the cooling system are denoted by dotted lines in FIG. 6. The connections between the various temperature sensors and the electronic controller may be accomplished via any known method, and the signals communicated by the temperature sensors may be of any appropriate type, for example, digital signals, analog signals, signals sent through a controller area network (CAN) link, and so forth. The electronic controller 540 may be disposed to receive additional information relative to the operating parameters of the machine, for example, the barometric pressure (BP) measured by a pressure sensor 539, the engine speed (RPM) of the engine 519, and so forth, which are measured by appropriate sensors disposed on the machine and connected to the electronic controller 540. The electronic controller 540 is also operatively connected to the valve 518 controlling the flow of hydraulic fluid from the pump 516 to the motor 512. The electronic controller 540 may generate a motor control signal that is communicated to the valve 518 and that results in operating the motor 512 at a desired state.

Figure 7:
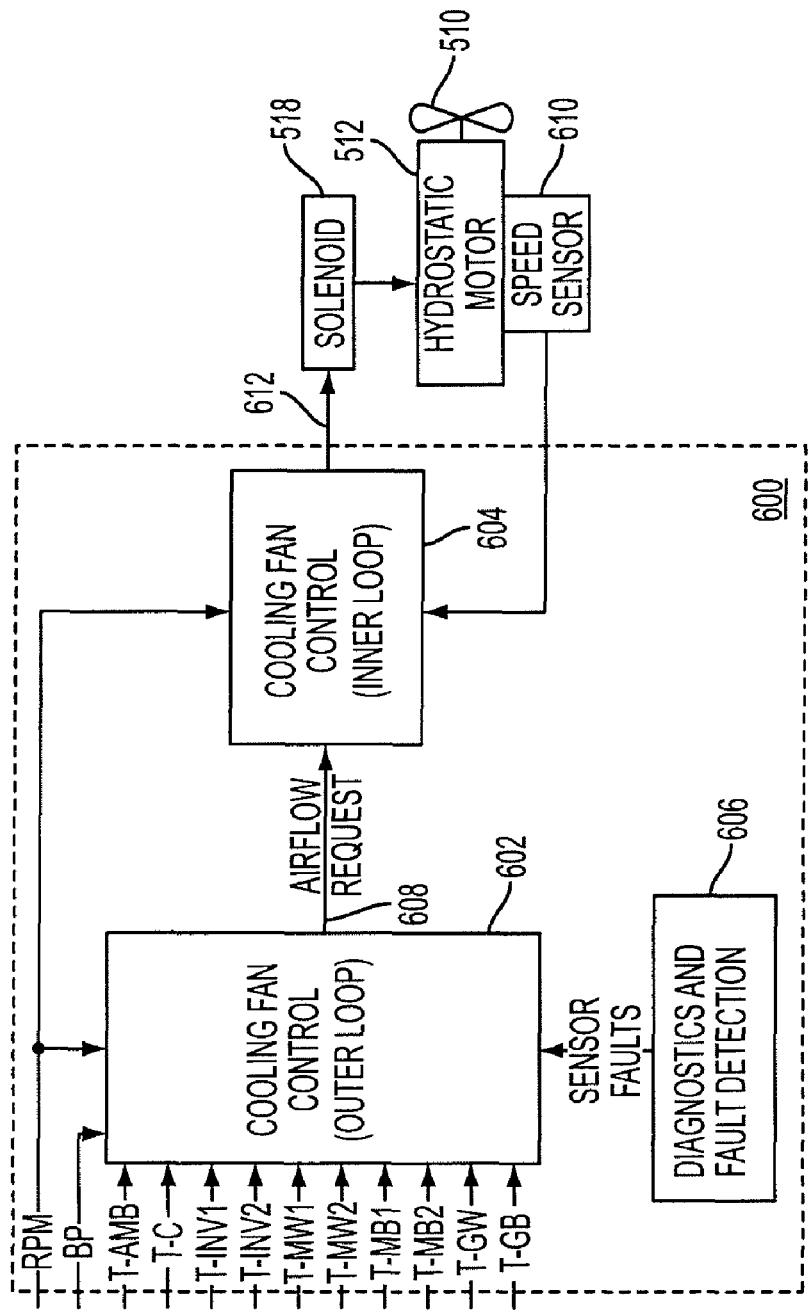
FIG. 7 is a block diagram of a cooling system control in accordance with the disclosure.

A block diagram for a control algorithm 600 operating within the electronic controller 540 is shown in FIG. 7. The control algorithm 600 is one example of a control algorithm that may be used to control the function of the fan motor 512 operating the fan 510. The control algorithm 600 includes an outer loop 602 that can determine a desired cooling airflow, and an inner loop 604 for controlling the fan such that the desired airflow may be achieved. These two loops are described individually below, but one can appreciate that their function may be combined into a single control algorithm.

The outer loop 602 may operate to determine a setpoint and, therefore, the initiation of operation of the fan motor 512. The inner loop 604 may adjust various parameters that control the operation of the fan motor 512. Other algorithms or sub-routines may operate in conjunction with the control algorithm 600. For example, various diagnostic and fault detection sub-routines may be utilized to determine whether certain components or sensors of the drive system are operational. Such algorithms are denoted generically by reference numeral 606 in FIG. 7 for the sake of simplicity.

Turning now to one embodiment of the outer loop 602, an algorithm receives the various temperature readings of the temperature sensors disposed in the system. For example, and in conjunction with FIG. 6, the outer loop 602 receives information indicative of the ambient temperature (T-AMB), the chopper circuit temperature (T-C), the inverter circuit temperatures (T-INV1 and T-INV2), the drive motor winding temperatures (T-MW1 and T-MW2), the drive motor bearing temperatures (T-MB1 and T-MB2), the generator winding temperature (T-GW) and bearing temperature (T-GB), and other parameters. The outer loop 602 may further receive information from the diagnostics and fault detection subroutines(s) 606 in the form of a sensor fault condition, an overheat fault condition in a component, and other such parameters. Such parameters may be used for failure detection and mitigation functions, such as alerting the operator, de-rating the machine to reduce the heat generated, activating the fan continuously to avoid overheating of any component, and so forth.

During normal operation or operation in the absence of any fault detection, the parameters listed thus far, along with the engine speed (RPM), may be used to determine a desired fan speed or airflow rate command. This command may be appropriately set such that the airflow generated within the cooling system in response to the command is adequate to maintain all cooled components within a normal operating temperature range.

Accordingly, an output node 608 of the outer loop 602 may communicate an airflow request to the inner loop 604. The inner loop 604 may control the speed of the fan motor, for example, the fan motor 512 (FIG. 6), by controlling the operation of the solenoid valve 518 in a closed loop fashion that uses the speed of the fan motor 512 as a feedback. The speed of the fan motor 512 may be measured or estimated by information indicative of the pressure and flow rate of the hydraulic fluid within the conduits 514 (FIG. 6), or it may alternatively be measured by a speed sensor 610 that is associated with the motor 512.

The inner loop 604 further bases the determination of the command signal to the solenoid on the engine speed (RPM). This is due to the face that the engine 519 may be used to drive the pump 516 that is generating the flow of hydraulic fluid operating the fan motor 512, as shown in FIG. 6. Hence, a solenoid command may be generated at an output node 612 of the inner loop 604. Embodiments that illustrate the function of the outer loop 602 and the inner loop 604 are shown, respectively, in the block diagrams of FIG. 8 and FIG. 9, which are described in further detail below.

In one embodiment, control of the motor and fan is accomplished in an "open loop" fashion. This means that the airflow request 608 from the outer loop 602 may be set independently of the operating conditions of the fan motor 512. In this embodiment, feedback from the fan motor 512 may be considered in the fanctioning of the inner loop 604.

Figure 8:
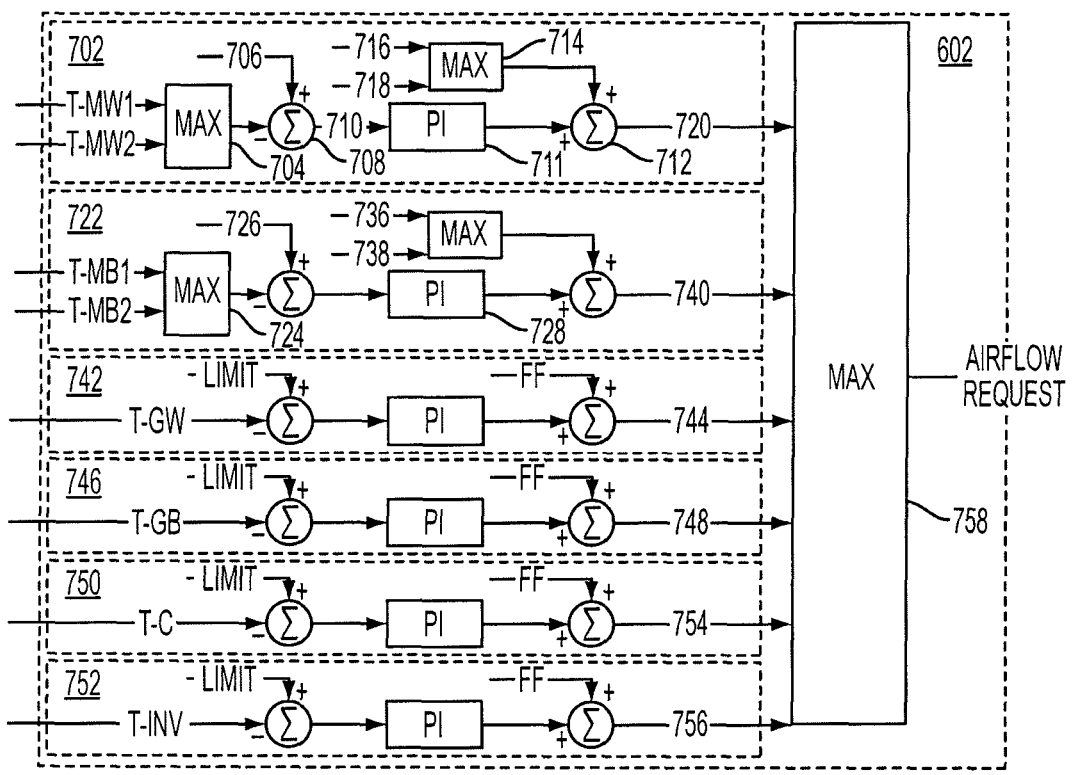
FIG. 8 is a simplified schematic illustrating one embodiment for a control algorithm in accordance with the disclosure.

FIG. 8 illustrates one embodiment for a control algorithm operating within the outer loop 602. The control algorithm may include a plurality of dedicated controllers or sentinels that monitor the temperature of individual components of the drive system. More specifically, a first sentinel 702 may be dedicated to monitoring the temperature of the windings in the drive motors through signals generated by temperature sensors disposed thereon. For example, the temperature sensors 552 that are shown in FIG. 6 may enable the electronic controller 540 to monitor the temperatures (T-MW1 and T-MW2) of the windings 534 of the motors 532. The first sentinel 702 may receive readings indicative of each individual temperature measured at each motor winding (T-MW1 and T-MW2), and select the maximum of the two values in a function 704. This maximum value may be compared to a temperature limit or threshold value 706 at a difference calculator 708. The difference calculator 708 generates an error 710 that, when negative, is indicative of the extent of overheating of the hottest of the two motor windings 534 (FIG. 6). The error 710 may be input to an open loop proportional/integral (PI) control 711, the output of which may be added to a summation function 712.

The summation function 712 may receive other terms, in this case, the maximum 714 of two feed-forward terms 716 and 718, indicative of the expected airflow that the first and second motors may require under a given set of operating circumstances of the machine. Such feed forward terms can improve the time response of a PI control. The output of the summation function 712, which is also the output of the first sentinel 702, may be a first desired airflow request 720.

In a similar fashion, other sentinel functions are used to determine respective desired airflow requests that are indicative of their respective component's cooling requirements. More specifically, a second sentinel 722 may be dedicated to monitoring the temperature of the bearings in the drive motors. The second sentinel 722 may receive readings indicative of the actual temperature experienced by the motor bearings (T-MB1 and T-MB2), discern the maximum value at 724, compare it to a threshold value 726, and use an additional PI control 728. This additional PI control 728 may generate an output that is added to additional feed forward terms 736 and 738 to eventually generate a second desired airflow request 740.

In a similar fashion, a third sentinel 742 may be dedicated to monitoring the generator's winding temperature (T-GW) to yield a third desired airflow request 744. A fourth sentinel 746 may also monitor the generator's bearing temperature (T-GB) to yield a fourth desired airflow request 748. Other sentinels, which are not described in detail for the sake of brevity but that operate similarly to the sentinels already described, may monitor the temperature of the chopper circuit (s) at 750, the inverter(s) at 752, and so forth. Each sentinel generates a desired air flow, shown as 754 for sentinel 750 and as 756 for sentinel 752, based on a specific temperature limit for each components (denoted generically as "LIMIT"). Each sentinel uses feed-forward ("FF") for control. Each desired airflow 720, 740, 744, 748, 754, and 756, may be input into a comparator 758 which may select the maximum desired airflow or airflow request output of the outer loop 602.

As can be appreciated, the outer loop 602 described thus far operates to continuously monitor the temperature of each component of interest in the drive system, and compares the component temperatures to individual temperature limits. The outer loop 602 can be tailored to accommodate any special design limits of the components. The outer loop is further capable of generating an airflow indication that would be required to effectively cool each of the components. Because all the components are disposed in series within the same cooling duct, and because one fan operates to cool all the components, the highest airflow command is selected and communicated to the inner loop 604. The inner loop 604, in turn, delivers this cooling airflow by appropriately commanding the operation of the fan.

Figure 9:
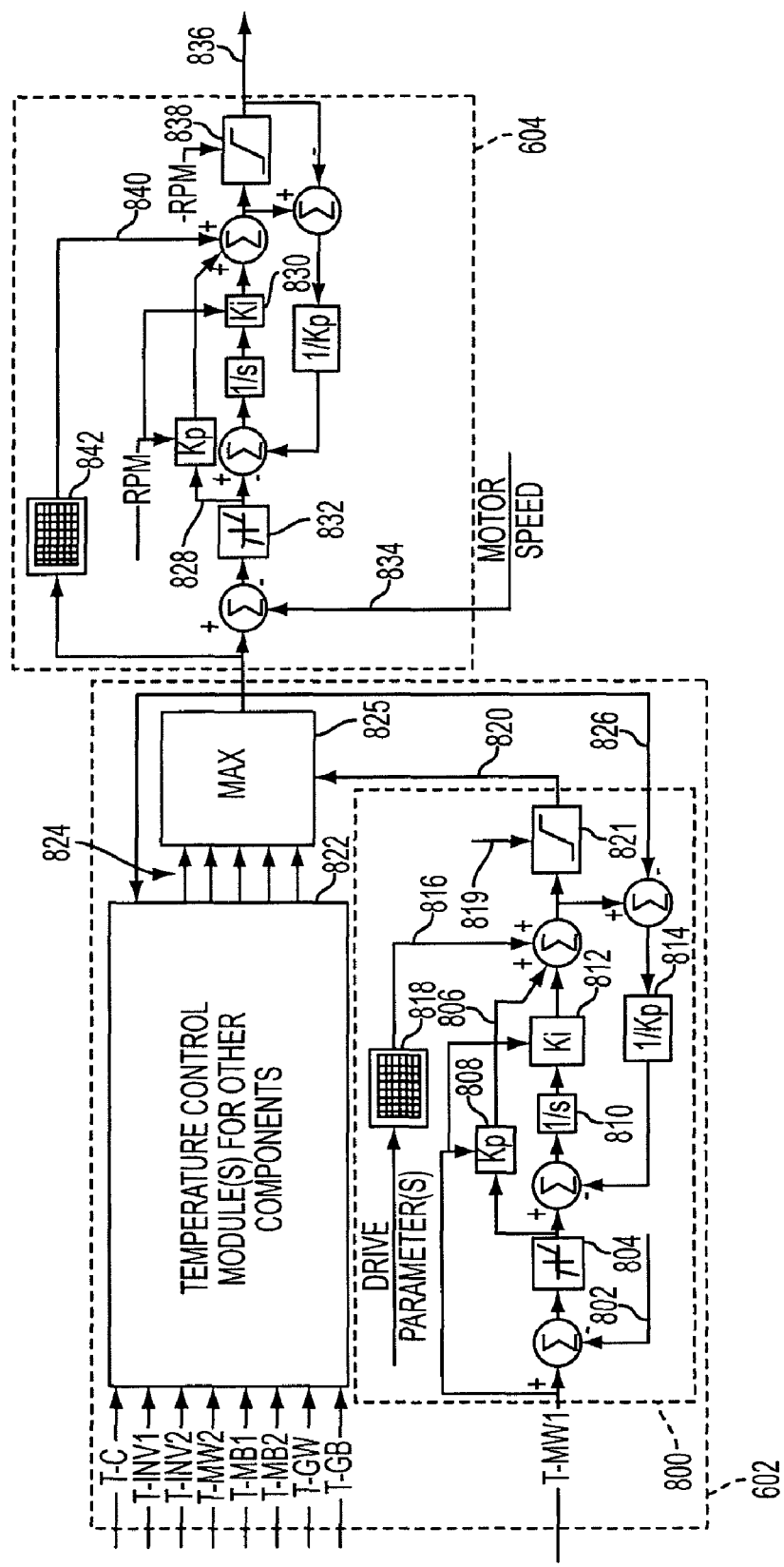
FIG. 9 is a simplified schematic of an alternate embodiment for a control algorithm in accordance with the disclosure.

A second embodiment for a controller 800 is shown in FIG. 9. In this embodiment, the control of the fan 510 based on the temperature for each component is integrated with various operating parameters of the machine to ensure that the cooling requirements of each component are better aligned with the operation of the machine. Rather than determining a plurality of airflow requests, as shown in FIG. 8, and selecting one to carry through to the inner loop 604, the embodiment shown in FIG. 9 is capable of generating a plurality of motor commands, one for each of the components being monitored. Thereafter, the motor or solenoid commands are reconciled to ensure a smooth operation of the motor. Specifically, an integrated control module 800 monitors the temperature of one of the components connected to the cooling system, such as the temperature of the windings (T-MW1) on one of the drive motors 532 (Drive Motor 1 as shown in FIG. 6). Other control modules, which are shown generally for the sake of simplicity, operate in similar fashion.

The control module 800, which is shown included within the outer loop 602 (FIG. 7), includes an error calculation or difference between the temperature being monitored, in this case the temperature of the windings (T-MW1) of a drive motor, and a temperature limit 802. The temperature limit 802 may be a constant temperature value that is indicative of an absolute temperature limitation of the windings or a subcomponent thereof, or it may be variable. The difference or error calculated between the temperature being monitored (T-MW1) and the temperature limit 802 is input to a hysteresis function 804. The output of the hysteresis function 804 is input into a PI control algorithm, one embodiment of which is presented herein.

The error or difference is first multiplied by a proportional gain (Kp) 806. The proportional gain Kp may be a constant or variable value. In this embodiment, the proportional gain Kp is the result of a function or calculation 808 that calculates the proportional gain Kp based on the magnitude of the difference between the input temperature and the desired temperature, and the magnitude of the input temperature T-MW1. This relationship may be used to scale the proportional gain Kp such that an improved time response of the PI control can be achieved. The difference is also input into an integrator loop, which includes an inverter 810, an integral gain (Ki) multiplier 812, and an anti-windup integral gain divider (1/Ki) 814. The proportional and integral terms of the PI control are added to one another, and the result is added to a feed forward term 816. The feed forward term 816 may be obtained by a function or lookup table 818 that determines the feed forward term 816 based on one ore more drive parameters of the machine. These drive parameters may include the operating torque of the drive motors, the speed of the motors, the voltage being commanded to the motors, the current passing through the motors, the voltage of the DC link, the voltage commanded to the DC link, the current passing through the DC link, the engine speed, the generator excitation voltage, and/or other parameters.

The sum of the proportional, integral, and feed forward terms yields a desired blower speed 820 that would be required, in this instance, to provide adequate cooling for the windings of the drive motor. A limiter 821 can be used to ensure that the desired blower speed 820 is always within the operating range of the blower. The limiter 821 may set upper and lower limits to the desired blower speed 820 that are either constant values or variable values that are based on environmental parameters, for example, the barometric pressure (BP), the ambient temperature (T-AMB), or machine operating parameters, for example, the engine speed (RPM), and so forth.

The remaining components of the drive system with temperatures being monitored may be arranged with the same or similar control modules as the control module 800. The remaining modules 822 are shown combined and denoted by the same reference numeral for the sake of simplicity. Each of the remaining modules 822 may output a desired blower speed, yielding a plurality of desired blower speeds 824. The desired blower speeds 820 and 824 are input to a comparator 825 that operates to select the maximum desired blower speed 826 as an output, in this embodiment, of the outer loop 602. As can be seen in the figure, the maximum desired blower speed 826 may be used as an anti-windup parameter for each integrator.

The maximum desired blower speed 826 is input to the inner loop 604, which includes a PI control that controls the solenoid valve 518 (as shown in FIG. 7). The PI control in the inner loop 604 may generally operate similarly to the PI control described relative to the control module 800, but with some differences. For example, a proportional gain (Kp) is determined by a function 828, and an integral gain (Ki) is determined by a function 830, with both functions calculating their respective gains based on the engine speed (RPM) of the machine. The inner loop 604 PI control includes a hysteresis function 832 acting on the difference between the maximum desired blower speed 826 and an actual speed 834 of the motor, which may be measured by the motor speed sensor 610 as shown in FIG. 7.

The output of the inner loop 604 is a command 836 to the solenoid controlling the flow of hydraulic fluid to the blower motor, but may alternatively be any other type of command signal that controls the motor directly or through another device, such as a chopper circuit controlling an electric motor. This command may be limited in a limiter 838 that may be included within the inner loop 604. The limiter 838 may limit the command 836 to be between upper and lower limits that can either be constant values or variable values that are determined based on engine speed (RPM). Moreover, the command 836 may be augmented by a feed forward term 840 that is determined by a table or function 842 based on the maximum desired blower speed 826 to provide stability to the control of the system.

INDUSTRIAL APPLICABILITY

The present disclosure is applicable to many machines and many environments. One exemplary machine suited to the disclosure is large off-highway trucks, such as dump trucks. Exemplary off-highway trucks are commonly used in mines, construction sites and quarries. The off-highway trucks may have payload capabilities of 100 tons or more and travel at speeds of 40 miles per hour or more when fully loaded. The trucks operate in a variety of environments and must be able to cope with high ambient temperatures.

The embodiments for drive system cooling arrangements and methods disclosed herein have universal applicability of various applications having one or more electric drive system components being actively cooled by forced convection. One can appreciate that the cooling duct disclosed herein may be designed to deliver a flow of cooling air to various components of a vehicle that are disposed in any arrangement. Similarly, the methods and control algorithms disclosed herein are capable of controlling the operation of a cooling fan or blower such that the individual cooling needs of one or more components can be accommodated while still promoting operation of the machine in a fuel or energy efficient manner.

Moreover, the methods and systems described above can be adapted to a large variety of machines and tasks. For example, backhoe loaders, compactors, feller bunchers, forest machines, industrial loaders, skid steer loaders, wheel loaders and many other machines can benefit from the methods and systems described.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A cooling system for cooling one or more components of an electric drive system in a machine, comprising:
a cooling duct extending between a first component and a second component of the machine;
a fan disposed to create an airflow within the cooling duct when the fan is operating;
a motor disposed to rotate the fan;
a first temperature sensor disposed to measure a first temperature of the first component, the first temperature being associated with a first temperature limit;
a second temperature sensor disposed to measure a second temperature of the second component, the second temperature being associated with a second temperature limit;
an electronic controller disposed to control operation of the motor, receive the first temperature, and receive the second temperature, and in response, to calculate a first temperature difference between the first temperature and the first temperature limit and generate a first command for the motor based on the first temperature difference, to calculate a second temperature difference between the second temperature and one of the first temperature limit and the second temperature limit to generate a second command for the motor based on the second temperature difference, to select the greater of the first command and the second command to yield the maximum command, and to control the motor based on the maximum command.

2. The cooling system of claim 1, wherein the first component and the second component are at least two of a chopper circuit, an inverter circuit, a generator bearing, a generator winding, a motor bearing, and a motor winding, that are operably associated with a machine.

3. The cooling system of claim 1, further including at least one of an ambient temperature sensor disposed to measure an air temperature of air entering the cooling duct, an engine speed sensor disposed to measure a speed of an engine associated with the machine, and a barometric pressure sensor disposed to measure a barometric pressure, wherein the electronic controller is disposed to limit each of the first airflow command and the second airflow command based on one of the air temperature, engine speed, and barometric pressure.

4. The cooling system of claim 1, further including a speed sensor disposed to measure a rotational speed of the motor and communicate a fan speed to the electronic controller, wherein the electronic controller is disposed to use the fan speed in a closed loop control system that controls the operation of the motor.

5. The cooling system of claim 1, further including:
a pump operating to circulate a flow of fluid through conduits that are connected to the motor; and
a proportional valve disposed to selectively modulate a flow rate of the flow of fluid in the conduits;
wherein fan motor is a hydrostatic motor whose rotational speed depends on a setting of the proportional valve, and
wherein the electronic controller is disposed to adjust the setting of the proportional valve.

6. The cooling system of claim 1, wherein the machine further includes a hollow drive axle forming a cavity, wherein the first component is an electric drive motor disposed at least partially within the cavity, and wherein the cavity is in fluid communication with the cooling duct and disposed to receive a portion of airflow.

7. A machine having an electric drive system, the electric drive system including an engine that is connected to a generator, the generator having an electrical output connected to a rectifier, the rectifier connected to an inverter, the inverter connected to an electric drive motor, the machine further comprising:

a cooling duct in fluid communication with a first component and a second component;
a fan motor operating a blower disposed within the cooling duct;
a first temperature sensor disposed to measure a first component temperature and to provide a first component temperature sensing signal;
a second temperature sensor disposed to measure a second component temperature and to provide a second component temperature sensing signal; and
an electronic controller disposed to receive the first component temperature sensing signal and the second component temperature sensing signal, to calculate a first difference between the first component temperature and a first component temperature limit and generate a first airflow command based on the first difference, to calculate a second difference between the second component temperature and a second component temperature limit and generate a second airflow command based on the second difference, to compare the first airflow command with the second airflow command to yield a maximum desired airflow, and to command the fan motor to operate such that the maximum desired airflow is generated within the cooling duct.

8. The machine of claim 7, wherein the first component and the second component are, at least two of a chopper circuit, an inverter circuit, a generator bearing, a generator winding, a motor bearing, and a motor winding.

9. The machine of claim 7, further including at least one of an ambient temperature sensor disposed to measure an air temperature of air entering the cooling duct, an engine speed sensor disposed to measure a speed of an engine associated with the machine, and a barometric pressure sensor disposed to measure a barometric pressure, wherein the electronic controller is disposed to limit each of the first airflow command and the second airflow command based on one of the air temperature, engine speed, and barometric pressure.

10. The machine of claim 7, further including a speed sensor disposed to measure a rotational speed of the fan motor and communicate a fan speed to the electronic controller, wherein the electronic controller is disposed to use the fan speed in a closed loop control system that commands the fan motor to operate.

11. The machine of claim 7, further including:
a pump operating to circulate a flow of fluid through conduits that are connected to the fan motor; and
a proportional valve disposed to selectively modulate a flow rate of the flow of fluid in the conduits;
wherein the fan motor is a hydrostatic motor whose rotational speed depends on a setting of the proportional valve, and
wherein the electronic controller is disposed to adjust the setting of the proportional valve.

12. The machine of claim 7, wherein the machine further includes a hollow drive axle forming a cavity, wherein the first component is an electric drive motor disposed at least partially within the cavity, and wherein the cavity is in fluid communication with the cooling duct and disposed to receive a portion of an airflow therefrom.

13. A method of operating a blower disposed in a convective cooling system associated with a first component and a second component of a machine, the cooling system including a cooling duct that directs a cooling flow of air toward the first component and the second component, and a blower operating under the control of a controller to direct a cooling flow of air through the cooling duct, the method comprising:

sensing a first temperature of the first component and providing a first temperature signal indicative of the first temperature;
sensing a second temperature of the second component and providing a second temperature signal indicative of the second temperature;
comparing the first temperature signal to a first temperature limit to yield a first temperature difference;
comparing the second temperature signal to a second temperature limit to yield a second temperature difference;
calculating a first desired airflow based on the first temperature difference;
calculating a second desired airflow based on the second temperature difference;
selecting the greater of the first desired airflow and the second desired airflow to yield a maximum desired airflow; and
operating the blower to generate a flow of air in the cooling duct that is at least equal to the maximum desired airflow.

14. The method of claim 13, wherein calculating the first desired airflow includes:
calculating a proportional term by multiplying the first temperature difference by a proportional gain to yield a proportional term, wherein the proportional gain is at least one of a constant value and a variable value that is based on the first temperature;
calculating an integral term by integrating a difference between the first difference and the first desired airflow;
calculating a feed forward term based on at least one drive parameter that is selected from the group consisting of a torque of a drive motor, a speed of the drive motor, a voltage of the drive motor, a current passing through the drive motor, a voltage between the rectifier and the inverter, a current between the rectifier and the inverter, an engine speed, and a generator excitation voltage; and
summing the proportional term, the integral term, and the feed forward term to yield the first airflow.

15. The method of claim 13, further including sensing an ambient air temperature, a barometric pressure, and an engine speed, wherein calculating the first desired airflow is based on at least one of the ambient air temperature, the barometric pressure, and the engine speed.

16. The method of claim 13, further including measuring a rotational speed of the blower, wherein operating the blower is based on a feedback signal to the electronic controller that is indicative of the rotational speed.

17. The method of claim 13, wherein the first component includes two sub-components, each sub-component having a respective one of two sub-component temperatures, and wherein the first temperature is selected to be a higher of the two sub-component temperatures within the electronic controller.

18. The method of claim 13, further including conductively cooling the first component and the second component with the airflow.

19. The method of claim 13, further including:
impelling a flow of hydraulic fluid through the motor with a pump;
metering the flow of hydraulic fluid with a proportional valve; and
adjusting a command signal that controls the proportional valve;
wherein operating the blower to generate a flow of air in the cooling duct that is at least equal to the maximum desired airflow is accomplished by adjusting the command signal.

20. The method of claim 13, wherein calculating the first desired airflow is accomplished by use of a first proportional/integral control algorithm, calculating the second desired airflow is accomplished by use of a second proportional/integral control algorithm, and operating the blower involves use of a third proportional/integral control algorithm.

* * * * *